United States Patent Office 3,162,582
Patented Dec. 22, 1964

3,162,582
PROCESS FOR THE PRODUCTION OF
ITACONIC ACID
Mario Alexander Batti, Elkhart, Ind., assignor to Miles
Laboratories, Inc., Elkhart, Ind., a corporation of
Indiana
No Drawing. Filed Dec. 31, 1962, Ser. No. 248,293
5 Claims. (Cl. 195—36)

The present invention relates to the elaboration of itaconic acid by organisms of the genus Aspergillus in aerobic submerged fermentation of carbohydrate-containing media. More particularly, the invention concerns a process for the elaboration of uncontaminated itaconic acid within predetermined controlled ranges of hydrogen ion concentration of the fermentation medium.

Heretofore, the art has endeavored to produce itaconic acid by various methods such as the fermentation of various carbohydrate-containing media by itaconic acid producing organisms, by the pyrolysis of citric acid, and by the decarboxylation of cis-aconitic acid. In each process, however, various other acids, i.e., citraconic acid, succinic acid, itatartaric and mesaconic acid have appeared as contaminants of the itaconic acid, and even though the optimal yield of itaconic acid has been in the ranges of 85 to 90%, production was not always economically feasible. More specifically, in fermentation procedures, the resulting itaconic acid was always contaminated by succinic acid, itatartaric acid and a 3rd heretofore unidentified acid. This contamination necessarily complicated the recovery process because additional processes were needed to remove said contaminating acids, special fractionation and ion exchange means being two such processes employed.

The disadvantages of the presence of the contaminants are numerous. Upon heating, itatartaric acid caramelizes and lends a brown color to the otherwise white itaconic acid. Further, the presence of itatartaric acid results in lower yields of the itaconic acid esters upon esterification and thereby reduces polymerization. The presence of the contaminant succinic acid results in an abnormal polymer structure which weakens the resulting polymer, thereby affecting its subsequent utility.

Although numerous attempts have been made to overcome the foregoing difficulties, none has been entirely successful. Briefly, itaconic acid is an unsaturated dicarboxylic acid having the following structural formula:

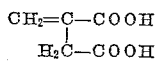

and because of its unsaturation, polymerization of the various esters of said acid occurs readily. Hence, the use of the acid itself and its various polymeric derivatives is extensive in the production of plastics, detergents and adhesives. It is therefore of great commercial value that a process for obtaining pure itaconic acid be made available.

It is an object of the present invention to provide a process for the elaboration of pure itaconic acid in which the pH of the fermentation medium is effectively controlled and maintained within a narrow range.

Another object is to provide an economical and commercially feasible process for obtaining pure itaconic acid directly from the fermentation medium, thereby obviating such additional steps as fractionation and purification.

It is a further object of the present invention to provide a process for the elaboration of itaconic acid by fermentation whereby formation of various contaminating substances is suppressed during said fermentation.

Other objects and advantages will become apparent from the following description taken in conjunction with the accompanying examples.

It has now been discovered that elaboration of pure itaconic acid, free from other acid contaminants, can be easily accomplished by controlling the pH of the fermentation medium during submerged fermentation by bacterial strains of Aspergillus.

More specifically, it has been found that, when the pH of the carbohydrate-nutrient containing fermentation medium previously inoculated with strains of itaconic acid-elaborating Aspergillus is above about 5.0, no acids whatsoever are formed. Instead, the organisms tend to form a heavy mycelial mat. It has been further found that contaminating acid formation occurs at pH's of less than about 3.0 but not within the approximate range of 3.0 to 5.0.

Although any itaconic acid producing organism can be used, a particularly preferred organism employed is the itaconic acid-producing strain of *Aspergillus terreus* inoculated into a carbohydrate containing medium. This medium may be comprised of such substances as glucose, sucrose, starch hydrolysates, fructose, molasses and the like in combination with various nutrients and minerals.

The pH is controlled during the latter part (approximately 5 to 6 days) of the fermentation process within a range of between about 3.0 and 5.0 in order to eliminate the formation of minor unwanted elaboration substances such as succinic and itatartaric acids. Although the exact mechanism of their formation is not presently known, it is believed that these acids are merely normal elaboration products of the Aspergillus organism formed during the latter part of the fermentation process after the itaconic acid concentration reaches about 5%. Therefore, the pH control aforementioned is initiated when the concentration of itaconic acid in the fermentation medium reaches approximately 4.6 to 5%. This concentration may then be determined in one of two ways, viz. by bromination according to the Friedkin method which is specific for itaconic acid or by an alkaline titration for acids generally. It should be noted that because of the general variations inherent in fermentation processes regarding the organism's ability to elaborate the various fermentation products, the duration of the culture after inoculation of the fermentation medium is relatively unimportant. Hence, it is the concentration of formed itaconic acid which is the determining factor as to when the pH will be controlled.

Since it was found that in *Aspergillus terreus*-inoculated fermentations, unwanted acids form at a pH of less than about 3.0, various alkalizing or buffering agents were added to the fermentation medium in order to control said pH between about 3.0 and 5.0. Although ammonium hydroxide has been found to be an effective buffer, other substances such as calcium carbonate, calcium hydroxide, potassium hydroxide and the like are equally satisfactory. In order to initiate mycelial growth capable of producing itaconic acid at the outset in the fermentation medium it is essential that the pH be acidic, for in such acid media all other growth is restricted. It is only in this respect that the initial pH is of some consequence.

In carrying this invention into effect it is preferred to maintain the pH at about between 3.0 and 5.0 from that time when the concentration of the elaborated itaconic acid reaches from about 4.6 to 5.0% of the fermentation medium. This concentration is determined by standard titration means or preferably by the bromination technique of Friedkin. The presence or absence of said unwanted acids is determined by chromatographic means although any other suitable means may be substituted.

In these examples, a suitable strain of *Aspergillus terreus* was used to inoculate a standard aqueous fermentation medium containing about from 10% to 25% of sucrose and other essential nutrients, i.e., various trace elements such as nickel, chromium, a nitrogen source, phosphorus, potassium and iron. The addition of such growth inhibiting substances as zinc and copper insures the growth of a suitable mycelium at a starting pH of about 5.0 or less depending on the amounts added. The total fermentation time for 15% sugar formulation is from about 6 to 7 days. The buffer may be added in solution, in slurry made with decationized water, or directly as such.

For the purpose of giving those skilled in the art a better understanding of the invention, the following illustrative examples are given and involve standard techniques and use of standard media of the type aforedescribed, although variations and modifications obvious to those skilled in the art are contemplated.

Example I

In order to show the formation and the presence of such unwanted acids as succinic, itatartaric and the like from inoculated media of an *Aspergillus terreus* strain, the initial pH of a 15% sucrose fermentation medium containing various nutrients and minerals was 5.10 and after inoculation quickly dropped to the normal operating pH which was determined to be about 2.08 and 2.20. No neutralizing agents were added, and as a result of chromoatographic paper strip studies, the presence of said unwanted acids was shown to account for nearly 15% of the total acids present.

Example II

In this example, an identical procedure of inoculation, the same bacterial strain and the same nutrient medium were used in the fermentation as indicated in Example I. The initial pH, however, determined to be 4.30. The operating pH was permitted to run at strong acidic pH's of between about 2.10 and 2.20. No neutralizing agents were added and the final pH was determined to be 2.05. Chromatographic studies indicated the elaboration of itaconic acid contaminated with succinic, itatartaric and a third unidentified acid.

Example III

The medium and the inoculum employed in this example were identical to those of Examples I and II, except for the inclusion in the nutrient medium of growth inhibitors. The initial pH of the fermentation medium was 4.30. However, when itaconic acid formation reached 4.81% as determined by the bromination test, calcium chloride was added. The pH at time of addition was about 2.1 to 2.2. At the end of 7 days, the pH was 2.05 and paper chromatographic studies showed the presence once again of unwanted acids to the extent of 14% of the total acid formed.

Example IV

In identical fashion as Example III, inoculation was effected at an initial pH of 4.3. When the concentration of itaconic acid formed reached 4.62% and at a pH of 2.08, calcium carbonate in a slurry of decationized water was added in an amount sufficient to elevate the pH to about 4.08, and the fermentation was permitted to continue to completion. The final pH was noted at 3.15 and chromatographic studies showed the absence of any of the previously noted contaminant acids. The itaconic acid formed was pure and completely white.

Example V

As in the previous example, the fermentation medium was fortified with some growth inhibiting elements so that the initial pH was 3.52. When the concentration of itaconic acid was determined to be at 4.81% and a pH of 2.02, calcium chloride was added and the subsequent drop in pH recorded at 1.98. The pH remained at less than 2.0 throughout the entire fermentation period with a resulting reading of 1.96. Paper chromatography studies indicated the presence of the three contaminating acids along with the itaconic acid. The strong acid salt of the buffer previously used, i.e., calcium carbonate, was used in order to dispel the possible explanation that the desired effect was due to the calcium ion and not the alkaline calcium buffer.

Example VI

In this example as in the previous ones cited, similar techniques for inoculation and preparation of fermentation medium were effected. The initial pH was 3.52, and when itaconic acid concentration reached 4.97% at a pH of about between 2.1 and 2.2, calcium carbonate was added in slurry form in an amount sufficient to elevate the pH to 3.97 where it remained throughout the remainder of the fermentation term. Upon the exhaustion of the nutrient medium by the *Aspergillus terreus* inoculum, the pH was determined and found to be about 3.1. Chromatography strips showed only pure itaconic acid present by the characteristic color streaking. No other acids appeared.

Example VII

As in Example VI, the fermentation medium had an initial pH of 3.52. The buffering material, a solution of potassium hydroxide, was added when the itaconic acid concentration reached 4.94%. The pH at that time was observed to be 2.05, and the potassium hydroxide added was in an amount sufficient to neutralize 2% acid. The effect was to elevate the pH to 4.0 although the pH at the termination of the fermentation process was 3.64. There were no color traces of any acids other than itaconic acid on the chromatographic strips.

Example VIII

An initial pH of 5.1 of the fermentation medium used in this example was noted. Upon the formation of a concentration of 4.81% of itaconic acid the pH was determined to be 2.1, and a solution of ammonium hydroxide was added in sufficient quantity to bring about an increase of the pH to 3.90. Upon the exhausting of the nutrient medium after 7 days, paper chromatography indicated no traces of any contaminating acids.

In summary, therefore, the present invention relates to a process for the elaboration of itaconic acid by the inoculation of a strain of *Aspergillus terreus* in an aerobic submerged fermentation of a suitable carbohydrate medium comprising the careful adjustment of the pH of said medium between about 3.0 to 5.0 when the concentration of the elaborated itaconic acid reaches about 4.6 to 5%. Said pH is effectively controlled by suitable alkaline buffering agents such as ammonium hydroxide, calcium carbonate, calcium hydroxide, potassium hydroxide and the like.

What is claimed:

1. In the elaboration of itaconic acid by means of fermentation of a medium with an itaconic acid producing organism, the method of suppressing the formation of contaminating acids comprising adding to the medium when the concentration of itaconic acid formed reaches about 4.6% sufficient neutralizing agent to control the pH of said medium within a range of from about 3.0 to about 5.0.

2. The method described in claim 1 wherein the organism is *Aspergillus terreus*.

3. The method according to claim 1 wherein the neutralizing agent is a member selected from the group consisting of ammonium hydroxide, calcium carbonate, calcium hydroxide and potassium hydroxide.

4. The method according to claim 1 wherein the organism is *Aspergillus terreus*, and the neutralizing agent is a member selected from the group consisting of ammonium hydroxide, calcium carbonate, calcium hydroxide and potassium hydroxide.

5. A process for the production of itaconic acid which comprises inoculating a carbohydrate medium with an itaconic acid producing strain of *Aspergillus terreus*, allowing the fermentation to proceed until the concentration of itaconic acid produced reaches a concentration of about from 4.6% to 5%, adding a neutralizing agent to adjust the pH of the medium to about from pH 3 to pH 5 and allowing the fermentation to continue until the desired production of itaconic acid has been achieved.

References Cited in the file of this patent
UNITED STATES PATENTS

| | | |
|---|---|---|
| 2,462,981 | Lockwood et al. | Mar. 1, 1949 |
| 2,657,173 | Pfeifer et al. | Oct. 27, 1953 |
| 3,044,941 | Nubel et al. | July 17, 1962 |